(No Model.)

H. W. LIBBEY.
CAR WHEEL.

No. 406,104. Patented July 2, 1889.

Witnesses.
George D. Reid
Timothy G. O'Connell

Inventor.
Hosea W. Libbey
by Edwin Planta
Attorney

UNITED STATES PATENT OFFICE.

HOSEA W. LIBBEY, OF BOSTON, MASSACHUSETTS.

CAR-WHEEL.

SPECIFICATION forming part of Letters Patent No. 406,104, dated July 2, 1889.

Application filed October 2, 1888. Serial No. 286,955. (No model.)

*To all whom it may concern:*

Be it known that I, HOSEA W. LIBBEY, a citizen of the United States, residing at Boston, in the county of Suffolk and State of Massachusetts, have invented certain new and useful Improvements in Car-Wheels, of which the following, taken in connection with the accompanying drawings, is a specification.

The object of my invention is to produce a wheel for steam or street railroads in which the friction between the flange of the wheel and the rail will be reduced to a minimum, especially when passing round curves.

The invention consists in constructing the tread and flange of the wheel of two independent disks secured together by bolts, the flange portion being provided with a series of disks which project beyond the tread, and which are free to rotate when they come in contact with the rail, thereby reducing the friction, as hereinafter fully described, and pointed out in the claims.

Figure 1:
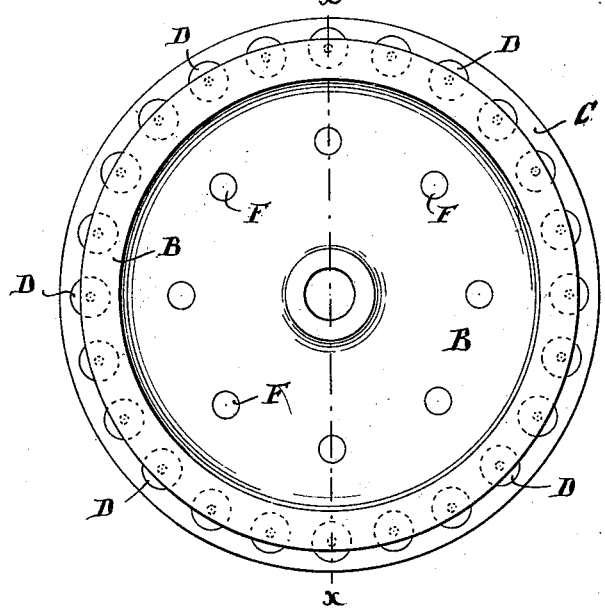
Figure 2:
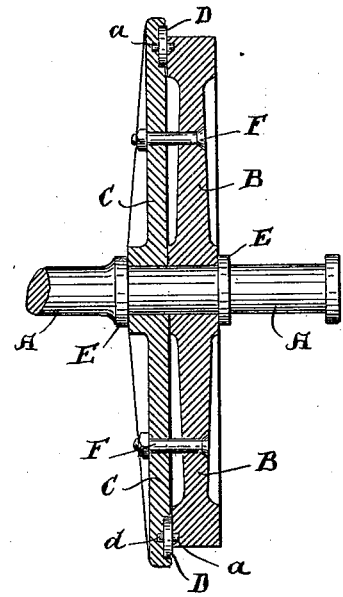
Figure 3:
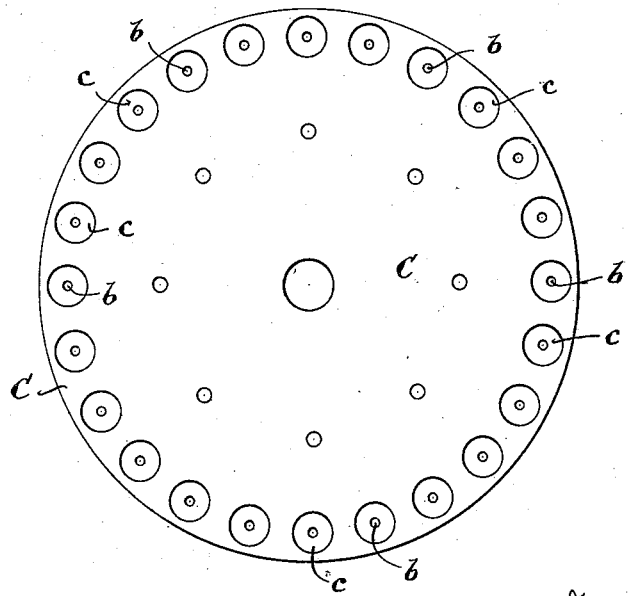

Referring to the accompanying drawings, Figure 1 represents an elevation of a car-wheel embodying my invention. Fig. 2 is a section through the wheel, taken on line $x\,x$ of Fig. 1. Fig. 3 is a view of the inner face of the portion of the wheel forming the flange, showing the recesses for the rotary disks.

A represents the axle, B the tread portion of the wheel, and C the flange portion. In the inner face of the flange portion C, near its perimeter, I form a series of circular recesses $c$, in the center of which is a small circular recess $b$, and in the inner face of the tread portion I form small recesses $a$, to correspond with the recesses $b$ in the flange portion C.

D D are disks of a diameter equal to the diameter of the recesses $c$ and provided with short axles $d$, that fit into the recesses $b$ in the flange portion C and corresponding recesses $a$ in the tread portion B.

The disks D are first placed in the recesses $c$, and the two portions C B placed together and secured by bolts F, and when the wheel is mounted upon the axle A it is held in place by means of collars E.

It will be seen that in a wheel thus constructed a portion of the disks D project below the tread of the wheel and the rail does not come into contact with the flange proper, but with the disks D, which are free to rotate, thereby reducing the friction to a minimum.

I do not claim a wheel formed of a separate tread and flange bolted together with a loose ring between them and projecting below the tread, as that is claimed in my application for patent filed August 8, 1888, Serial No. 282,229; nor do I claim a wheel the tread and flange of which are free to rotate independent of each other with anti-friction rollers let into the inner face of one portion, as that is claimed in my application for patent filed October 2, 1888, Serial No. 286,956; but

What I claim as my invention is—

1. A wheel formed of two independent parts B C, bolted together, with a series of disks D arranged around the inner face of the flange portion and projecting below the tread, substantially as and for the purposes set forth.

2. In a car-wheel, the tread portion B and flange portion C, provided with a series of circular recesses, in combination with the disks D, substantially as and for the purposes set forth.

3. A car-wheel provided with a series of disks in the flange, which project below the tread, substantially as and for the purposes set forth.

In testimony whereof I have signed my name to this specification, in the presence of two subscribing witnesses, on this 24th day of September, A. D. 1888.

HOSEA W. LIBBEY.

Witnesses:
 CHARLES STEERE,
 EDWIN PLANTA.